United States Patent

[11] 3,588,332

| [72] | Inventors | Angelo Vaccaro<br>Port Washington;<br>Harold F. E. Dixon, Douglaston, N.Y. |
|---|---|---|
| [21] | Appl. No. | 760,324 |
| [22] | Filed | Sept. 17, 1968 |
| [45] | Patented | June 28, 1971 |
| [73] | Assignee | Columbia Controls Research Corporation<br>Glen Cove, N.Y. |

[54] FACSIMILE APPARATUS WITH VIBRATING PRESSURE STYLUS AND METHOD THEREOF
4 Claims, 6 Drawing Figs.

| [52] | U.S. Cl. | 178/6.6 |
| [51] | Int. Cl. | H04n 1/24 |
| [50] | Field of Search | 178/6.6, 6.6 (B) |

[56] References Cited
UNITED STATES PATENTS
2,575,714  11/1951  Johnson et al. ............... 178/6.6

Primary Examiner—J. Russell Goudeau
Attorney—Johnson and Kline

ABSTRACT: A method and apparatus for making a facsimile copy of an original subject matter such as a picture, drawing, photograph, etc. in which the copy has the varying shades or tones of blackness that correspond to those in the original by utilizing a pressure-responsive copy sheet and a stylus with the stylus having both a variable pressure against the transfer sheet and also being vibrated to vary the width of the line on the sheet.

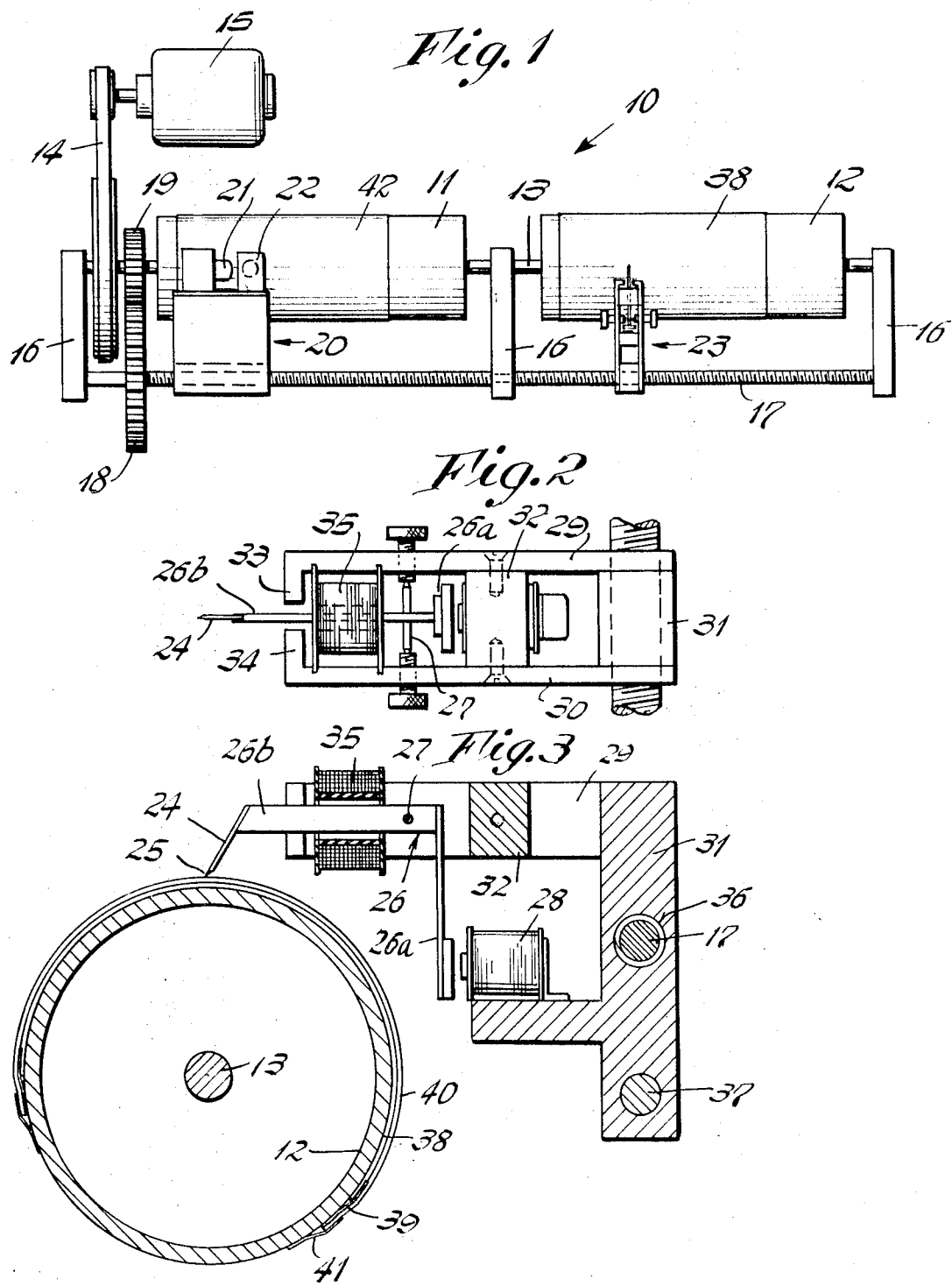

Fig. 4
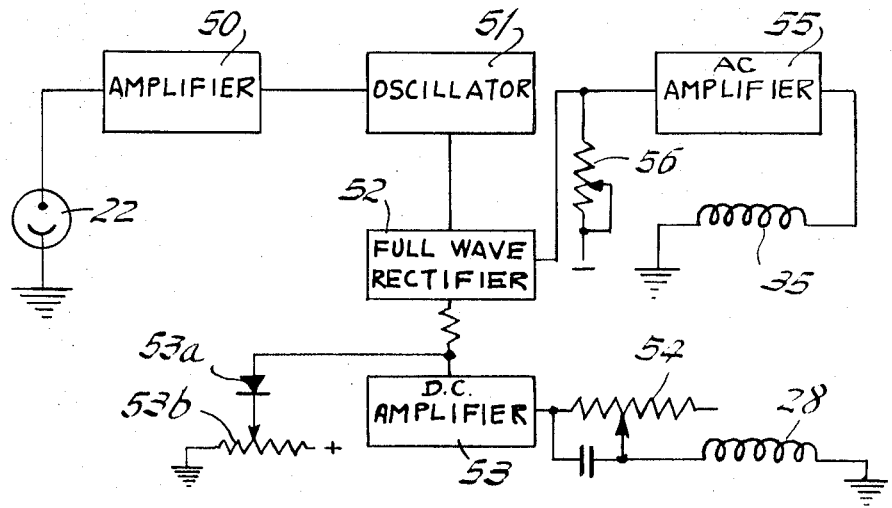
Fig. 5
| SHADE GRADIENT | |
|---|---|
| 1 WHITEST | LEAST PRESSURE |
| 3 | MOST PRESSURE |
| 4 | MOST PRESSURE & SMALL AMPLITUDE |
| 10 | MOST PRESSURE & INTERMIDIATE AMPL. |
| 15 BLACKEST | MOST PRESSURE & MAX. AMPLITUDE |
Fig. 6
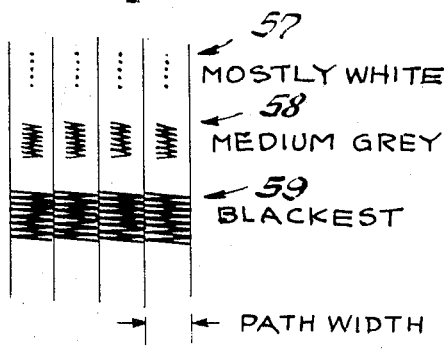
INVENTORS
Angelo Vaccaro
Harold F.E. Dixon
BY
Johnson and Kline
ATTORNEYS

FACSIMILE APPARATUS WITH VIBRATING PRESSURE STYLUS AND METHOD THEREOF

While it has heretofore been suggested to utilize facsimile machines for making a copy of an original, these apparatus have in many instances been unable to produce an accurate copy. Especially they have not been satisfactory if the original had many different tones or shades of gray as would occur in a black and white photograph. Normally the apparatus has had a photoelectric cell which traverses a path of minute width to completely scan the original and to sense the light reflectance of the original along the path. The copy is made by a stylus or other image forming device which traverses simultaneously an identical path on the copy sheet. The facsimile or copy is produced by the photocell causing the stylus to make a mark on the copy in response to the photocell sensing the light reflectance. With a pressure sensitive copy sheet, one attempt to vary the shade of the copy was to vary the pressure of the stylus on the copy to make a darker or wider line when the photocell sensed a darker portion of the original. However, this was generally unsuccessful in view of the pressure transfer sheet releasing all its ink with a definite amount of pressure or releasing very little with a lesser amount of pressure and thus very little shading was achieved. Other attempts have included increasing the effective width of the stylus by imbedding it into the transfer sheet but the maintaining of the precise dimensional relationship between the stylus and the copy was difficult to achieve and thus would introduce inaccuracies into the copy.

It is accordingly an object of the present invention to provide an apparatus and method for making a copy of an original in which many various shades of gray in the original are faithfully reproduced in the copy.

Another object of the present invention is to provide a method and apparatus which though using a pressure-responsive copy sheet is capable of making a copy which closely resembles a line or one-half tone copy of the original.

A further object of the present invention is to provide an apparatus which achieves the above objects but yet which is extremely simple in construction, durable in use and relatively rapid in making the copy.

In carrying out the present invention there is provided, as in the heretofore suggested facsimile machines, a pair of drums on one of which the original is placed while on the other a pressure transfer copy sheet is positioned. Adjacent the periphery of the original carrying drum there is mounted a photocell while adjacent the periphery of the copy sheet carrying drum there is mounted a stylus. The drums are simultaneously rotated and the stylus and photocell are moved axially with respect to their drums so that both travel an identical, helical path of substantially small width. The photocell will sense the light reflectance upon its path and through circuitry cause the stylus to bear against the copy sheet to produce the copy.

In accordance with the present invention, the stylus is caused to have a variable pressure against the transfer sheet for the lighter shades of gray in the original. The variation in pressure will enable the stylus to reproduce from approximately the lightest gray (mostly white) to a shade having about 20 percent black and 80 percent while. For the remainder of the shades of the original, wherein there is a greater percentage of black, the stylus is caused to exert its maximum pressure against the transfer sheet and it is also caused to increase its effective marking area as the blackness sensed by the photocell increases. Thus, as the photocell senses a darker shade of gray, the stylus will increase its effective marking area until when completely black is sensed the stylus will have an effective marking area that is substantially equal to the width of its path so that adjacent areas of the copy will be completely black.

The variation in the effective marking area of the stylus is simply and effectively achieved according to the present invention by causing the stylus to be oscillated or vibrated whenever a shade of gray is sensed that is greater than that shade which just pressure alone on the stylus marking area is capable of achieving. The amplitude of the stylus vibration is directly related to the degree of blackness and thus will vary in accordance with the signal from the photocell as it senses the various shades. In this manner a copy is made in which, for the light shades, only a thin line is made by the stylus while for the darker shades a wider line is made. The resulting copy accordingly will closely resemble a line copy of the original as for other than completely black there will be in effect a line of white between each of the black lines caused by the stylus.

Other features and advantages will hereinafter appear.

In the drawing:

FIG. 1 is a diagrammatic representation of the facsimile machine of the present invention.

FIG. 2 is a top view of the stylus.

FIG. 3 is a side section of the stylus and drum.

FIG. 4 is an electrical schematic and block diagram of the various electrical components of the present invention.

FIG. 5 is a table showing the relative shades and stylus condition.

FIG. 6 is a pictorial representation, substantially enlarged, of lines produced by the stylus.

Referring to the drawing, the apparatus is generally indicated by the reference numeral 10 and includes an original drum 11 and a copy drum 12. The drums are mounted on a common shaft 13 that is connected through a belt 14 to a motor 15 such that rotation of the motor produces rotation of the drums at preferably a relatively slow speed. Mounted adjacent the drums on brackets 16 is a threaded shaft 17 that is caused to be rotated by a gear 18 interconnected with a gear 19 on the shaft 13.

The threaded shaft 17 carries a photocell assembly 20 which includes a source of light 21 and a photocell 22. Adjacent the copy drum 12 there is mounted a stylus assembly, generally indicated by the reference numeral 23, which is also carried by the shaft 17. With this construction, it will be understood that upon rotation of the shaft 13 the drums will rotate and the photocell assembly 20 and stylus assembly 23 will be caused to traverse a path that is parallel with the axis of the drums. In this way both assemblies will traverse a helical path about their respective drum with the paths being substantially identical and having a relatively small width, such as on the order of 0.010 of an inch.

While the original and copy drums and their associated assemblies are shown as being on common shafts, it is within the scope of the present invention to mount them separately so that they may be spaced at different locations. The stylus assembly has a stylus 24 having a relatively small point or marking area 25 and a shank that is secured, as by welding, to an L-shaped carrier 26. The carrier is pivoted as at 27 to enable the stylus point to move towards and away from the drum 12 under the action of a pressure exerting electrical coil 28 which is mounted adjacent the depending arm 26a of the carrier 26. Upon energization of the coil 28, the carrier is attracted thereto causing a pivoting of the stylus towards the drum 12 with the amount of forcing or pressure of the stylus on the drum being related to the degree of energization of the coil 28.

Extending on opposite sides of the stylus are a pair of arms 29 and 30 that have their ends secured to a support 31. Intermediate their length, there is positioned a permanent magnet 32 which magnetizes the remote inturned ends 33 and 34 of the arms. The portion 26b of the carrier that carries the stylus extends between the inturned ends. An electrical coil 35 encircles the carrier portion 26b and is supported by the arms 29 and 30.

With the above construction, it will be appreciated that the stylus carrier 26 upon energization of the coil 28 will pivot the stylus 24 towards the drum with the pressure determined by the degree of energization of the coil 28. Also, as the coil 35 is energized with an alternating current, it will cause the portion 26b carrying the stylus to vibrate or oscillate at the frequency of the AC by reason of the interaction of the permanent magnetic field produced by the magnet 32 at the inturned ends and the magnetic field produced by the coil 35. The carrier portion 26b is made to be somewhat resilient so that it may flex or bend without interfering with the pivot 27.

As shown in FIG. 3, the shaft 17 extends through a threaded aperture 36 formed in the support 31 for threading cooperation therebetween. For stabilizing the carrier on the threaded shaft 17, a guide rod 37 also extends through the support 31. It is also desired that the photocell assembly be similarly stabilized by the rod 37 also passing therethrough.

In the specific embodiment herein described, the copy drum 12 has a copy sheet 38 secured to its periphery as by Scotch tape 39 and it is overlaid by a pressure-responsive transfer sheet 40 also secured as by Scotch tape 41 to the drum periphery. Thus as the stylus bears against the exterior of the transfer sheet 40 it will cause transfer of the ink therein to the copy sheet to form the image. Specifically, the sheet 38 may be a planographic printing sheet while the pressure-responsive sheet 40 may be carbon paper. Naturally, it is within the scope of the present invention to use other pressure-responsive sheets such as those having a pressure displaceable medium (one example of which is I.C. paper) or pressure transparentizable sheets or combinations thereof.

Referring to FIG. 5, there is shown a table indicating the condition of the stylus for some of the various shades which may be present in the original. For the shade that is whitest, only the pressure coil 28 is energized and it is energized only slightly so that the stylus only lightly bears against the transfer sheet. In this manner the stylus will successively bounce along the copy sheet producing small dots along its path. For a slightly darker impression by the stylus, more pressure is exerted by greater energization of the coil 28 so that with the maximum pressure exerted the stylus is capable of forming a continuous line which is about the width of the marking area or point 25. One specific size of the point 25 that has been found to be satisfactory is about 0.002 inches in diameter when the path width is 0.010 inches so that the stylus will form a line that is approximately 20 percent of the width of its path.

For a darker shade of gray the stylus is maintained with the most pressure to form a continuous line and the coil 35 is energized with AC of a variable power. Thus with the smallest amount of power in the coil 35, the line formed by the stylus will just slightly increase over the width of its area while for the blackest part in the original, the stylus will have its maximum amplitude of vibration be substantially equal to the width of its path. Thus it will completely traverse the copy sheet throughout the extent of its path to form a black line that has the width of the path. While FIG. 5 discloses a zigzag line, this is for the purposes of clarity of illustration as the vibrational frequency of the stylus is such that it will make one complete to and fro movement while traversing a length of the path that is substantially equal to the length of the marking point so that the zigzag lines will essentially overlap.

Shown in FIG. 4 is a circuit for effecting the control of the two coils 28 and 35 in accordance with the signals from the photocell 22. Thus the photocell 22 has its output connected to an amplifier 50 which amplifies the electric signal of the photocell as determined by the light reflectance of the portion of the original 42 which it is scanning. The amplified signal is supplied to a continually running oscillator 51. The oscillator 51 produces a full wave AC signal having a constant frequency but with an amplitude determined by the signal received from the amplifier 50. The pressure coil 28 receives DC power from the oscillator 51 through a full wave rectifier 52 and an amplifier 53 together with a current adjusting resistor 54.

The signal from the amplifier 53 is a DC power having a voltage which is proportional to the AC voltage from the oscillator 51 and thus will vary in value with variations in the DC signal. To limit the current to the coil 28 so that it maintains, for values when the most pressure is desired, a constant pressure irrespective of increase in the output from the oscillator 51 there is provided a voltage clamping circuit which includes a diode 53a and an adjustable resistor 53b. The resistor 53b is adjustable to permit setting the maximum voltage which can be applied by the rectifier to the DC amplifier 53 and which in turn is applied to the pressure coil 28. As shown in FIG. 5, one setting is for a shade gradient that is at least 3. The resistor 54 permits alternating of the current to the coil to provide adjustment for different pressure sensitive media, variation between coils, etc.

The coil 35 is connected through an AC amplifier 55 to receive the AC varying amplitude voltage from the oscillator 51. However, as it is desired to prevent the amplifier 55 from being operative to effect vibration of the stylus for the mostly white values, an adjustable bias resistor 56 is connected to place a DC voltage between that oscillator and amplifier which inhibits or blocks the AC signal from the oscillator 51 when the value of the signal is below that resulting from the photocell 22 sensing a shade gradient less than 4.

Shown in FIG. 6 is a pictorial illustration of a section of a copy. The mostly white area 57 consists of dots caused by only slight pressure of the stylus on the copy sheet and could constitute perhaps a shade gradient of 5 percent black and 95 percent white. The medium gray portion 58 is approximately 50 percent black and 50 percent white while the black portion 59 is essentially 100 percent black. Again the zigzag lines are exaggeratedly spaced for clarity. From this section it will be appreciated that the final copy is essentially a halftone line copy having white widths between the black lines and that the relative width of the lines will vary in accordance with the signals from the photocell.

One frequency which has been found to be acceptable for the oscillator 51 is 6,000 c.p.s. though others may be employed depending on the various factors such as the reaction time of the stylus, the size of the marking point 25, the path width, etc. Moreover, while there has been specifically disclosed nonvibration for lighter values of a shade gradient and maximum pressure and vibration for darker shade values, clearly the value of the shade gradient may be altered as desired by altering the adjustable resistors 53b, 54 and 56.

It will accordingly be understood that there has been disclosed a method and apparatus for making a facsimile copy of an original and especially for enabling the accurate reproducing of the shades in the original. This is achieved by the use of a stylus which for the darker shades of gray is caused to vary the effective width of the line that it forms by being caused to vibrate as it traverses its path. The amplitude of the vibration as compared to the path width is varied in accordance with the degree of black in the original as determined by the photocell sensing a decrease in reflectance. For the lighter shades, the stylus is prevented from vibrating but has the degree of pressure which it exerts on the copy sheet altered to provide the various light shades.

Variations and modifications may be made within the scope of the claims and portions of the improvements may be used without others.

I claim:

1. An apparatus for producing a facsimile copy of an original comprising means for scanning the original along a path to provide electrical signals corresponding to different shades of darkness of the original along the path with a selected value of electrical signals corresponding to one shade of darkness, means for supporting the copy including pressure-responsive means, a stylus mounted to bear against the pressure-responsive means and produce the copy by pressure against the pressure-responsive means, means for moving the stylus to have it travel a path on the copy identically with the path of the scanning means, means for pressing the stylus against the pressure-responsive means and including means for varying the pressure in response to values of electrical signals less than the selected value corresponding to lighter shades than the one shade and means for vibrating the stylus transversely to its path in response to values of the electrical signals greater than the selected value that corresponds to darker shades than the one shade whereby the pressing and vibrating movements of the stylus on the pressure-responsive means determines the amount of darkness of the line being formed on the copy.

2. The invention as defined in claim 1 in which the stylus is mounted on a pivoted carrier for movement towards and away from the pressure-responsive means, electrical coil means for urging pivoted movement of the carrier to urge the stylus toward the pressure-responsive means with the value of power to the coil determining the pressure with which the stylus is urged against the pressure-responsive means and electrical coil means for vibrating at least the portion of the carrier carrying the stylus transversely to the pivotal movement of the carrier.

3. The method of making a facsimile copy of an original comprising scanning the original along a path to obtain indications of the light reflectance of the original along the path, providing a pressure-responsive copy sheet, pressing a stylus against the copy sheet including the step of decreasing the pressure with indications of light reflectance increasing from a value of pressure caused by one shade of darkness in the original, moving the stylus in a path on the copy sheet synchronously and identically to the scanning path with the width of the path being substantially greater than the width of the portion of the stylus bearing against the copy sheet and vibrating the stylus transversely to its path in response to indications of light reflectance that are less than that caused by the one shade in the original.

4. The invention as defined in claim 3 in which the step of pressing the stylus against the copy sheet includes the step of pressing for the maximum pressure for the one shade and maintaining the maximum pressure during the step of vibrating the stylus.